United States Patent [19]

Crone

[11] 4,196,538
[45] Apr. 8, 1980

[54] FISH-HOLDING APPARATUS

[76] Inventor: Audrey R. Crone, 758 W. Philadelphia St., York, Pa. 17404

[21] Appl. No.: 947,266

[22] Filed: Sep. 29, 1978

[51] Int. Cl.² ............................................. A01K 97/04
[52] U.S. Cl. ............................................ 43/55; 17/69; 17/70; 206/315 R
[58] Field of Search ............... 43/55, 54.5 R, 54 R, 43/53.5 R; 269/270; 17/69, 70; 206/315

[56] References Cited

U.S. PATENT DOCUMENTS

| | | | |
|---|---|---|---|
| 752,600 | 2/1904 | Sinclair | 43/54 R |
| 2,160,436 | 5/1939 | Jones . | |
| 2,346,744 | 4/1944 | Glassman . | |
| 2,544,049 | 3/1951 | Sawner . | |
| 2,547,592 | 4/1951 | Morris | 43/53.5 |
| 2,703,594 | 3/1955 | Slinkard | 269/270 X |
| 2,741,061 | 4/1956 | Harrison . | |
| 3,556,507 | 1/1971 | Haskell | 17/70 |
| 3,968,588 | 7/1976 | Peterson | 43/53.5 |
| 4,000,577 | 1/1977 | Kelly | 43/55 |

*Primary Examiner*—Harold D. Whitehead
*Attorney, Agent, or Firm*—C. Hercus Just; C. Hercus Just

[57] ABSTRACT

This invention comprises a fish holding apparatus especially adapted to hold eels, catfish, and the like, by arranging an elongated box to be supported vertically and having a slide at one end adapted to serve as a cutting board and also having serrated gripping members at one end which coact with a fixed serrated gripping member attached to one side of said end of the box for coaction with the gripping members on the slide. The opposite end of the box also has a foot engageable member to hold the box steady while the slide is being manipulated from an open position in which the fish is extended into the box with the exception of the head and the slide is then moved to engage the head between the serrated members referred to above in order that the mouth of the fish is positioned for removal of the hook therefrom.

3 Claims, 7 Drawing Figures

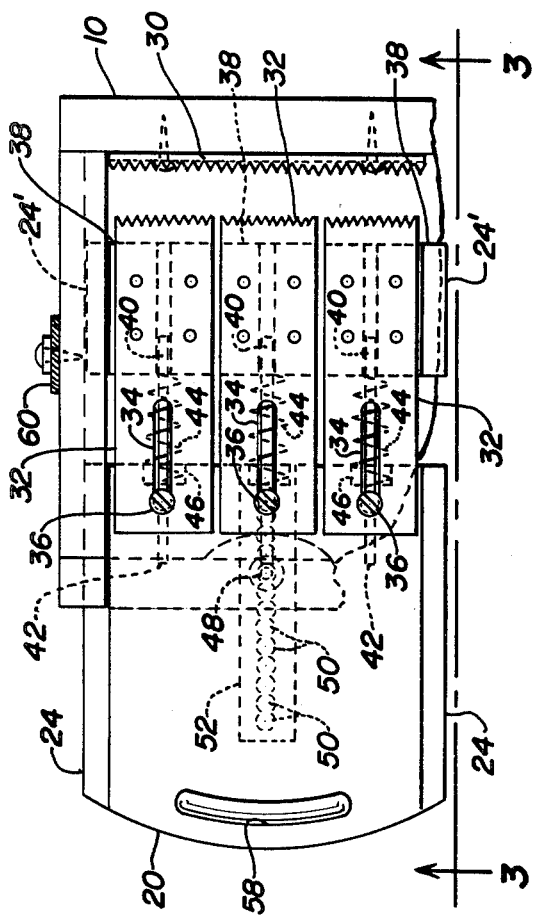

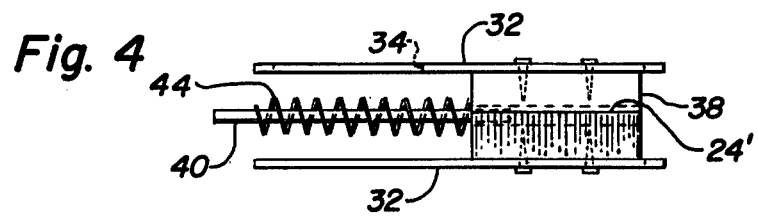
Fig. 4
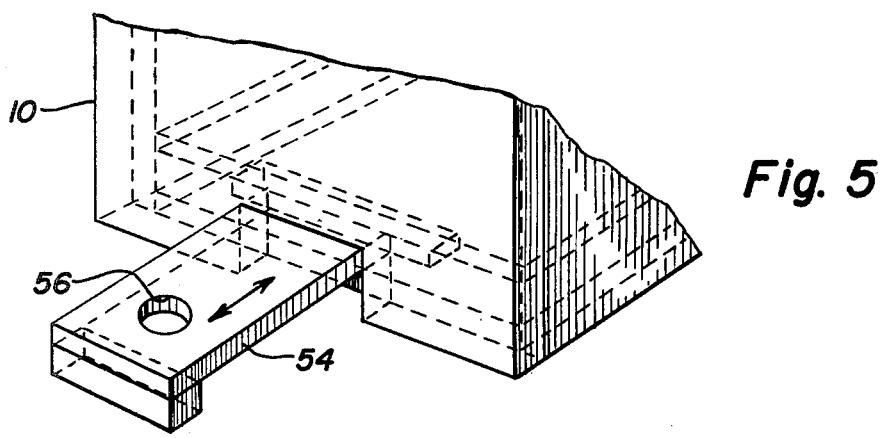
Fig. 5
Fig. 6
Fig. 7
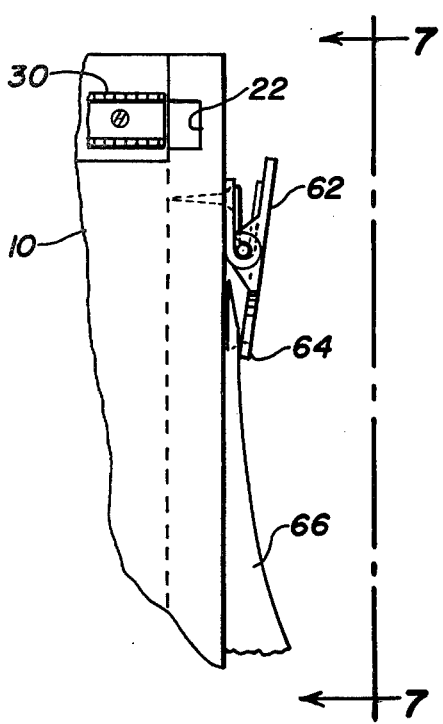
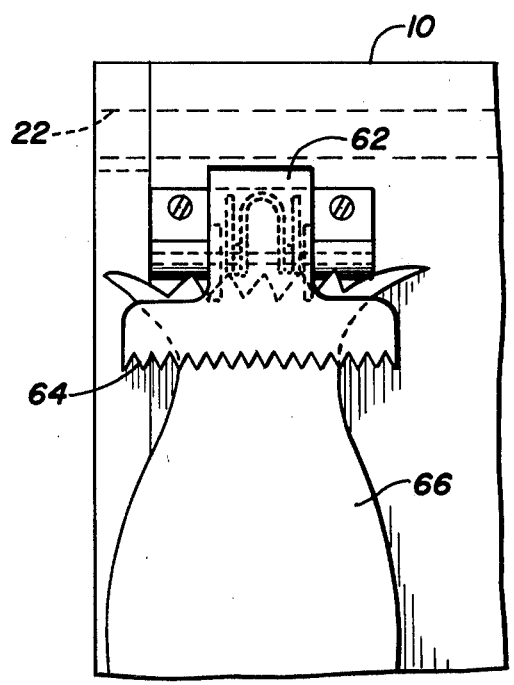

4,196,538

FISH-HOLDING APPARATUS

BACKGROUND OF THE INVENTION

Removing hooks from the heads or mouths of certain types of fish, such as eels, catfish and the like, is a difficult undertaking, primarily because, in the case of eels, they are very slippery and are difficult to grip firmly, particularly when they are wiggling. Catfish, also, have spurs on the head which are sometimes difficult to avoid when removing hooks from the head of the catfish. Accordingly, various types of apparatus have been devised heretofore which mostly are of a hand-held type for purposes of extending the head of an eel or the like beyond the device so that the hook might be removed from the head of the fish. A typical apparatus of this type such as have been developed heretofore is represented by U.S. Pat. No. 2,547,592, to Morris, dated Apr. 3, 1951.

Boxes also have been employed in conjunction with fishing but these mainly have been for purposes of holding bait of various kinds, including small fish, grasshoppers and the like. Typical examples of such boxes are shown in prior U.S. Pat. Nos.:

2,160,436—Jones—May 30, 1939
2,346,744—Glassman—Apr. 18, 1944
2,544,049—Sawner—Mar. 6, 1951

In the foregoing patents, Jones and Sawner show slidable tops which are movable to open position for gaining access to the interior of the boxes, either for loading the bait into the same or removing it therefrom. Glassman also shows a pivoted top which has been indicated that it may be used as a seat.

Another somewhat box-type fish-holding device is shown in U.S. Pat. No. 2,741,061, to Harrison, dated Apr. 10, 1956, in which a pivoted lid has spikes thereon coengageable with similar spikes in the bottom of the box.

Serrated, fish-engaging elements which cooperate with each other for engaging a fish also have been employed in creels, such as illustrated in prior U.S. Pat. No. 752,600, to Sinclair, dated Feb. 16, 1904.

A somwhat sophisticated type of fish-holding means also is illustrated in recent U.S. Pat. No. 3,968,588, to Peterson, dated July 13, 1976, in which a box-like arrangement has a spiked panel coengageable with similar spikes on a movable blade actuated by a foot treadle, which extends from the lower end of the box, the box being adapted to be supported in vertical position.

It has been found that different arrangements of certain of the features of the prior art, such as referred to above, and improvement thereon can be devised which provide a very simple but sturdy device capable of not only holding the head of a fish for purposes of removing a hook, but also serving as a receptacle for the fish after removing the hook, and simultaneously providing other conveniences described in detail hereinafter.

SUMMARY OF THE INVENTION

It is one of the principal objectives of the present invention to provide a relatively simple box which may be either square or rectangular in cross-section and elongated so that when lying upon one side, the opposite side may serve as a seat, but the box when in use normally is disposed vertically, and the upper end of the box is open but adapted to be closed by a transversely slidable cover having preferably a plurality of slidable serrated blades along one edge which are cooperable with a serrated strip fixed to one side of said open end of the box, whereby when the slide is moved to open position, a fish on a line and hook may be extended into the open end of the box but leaving the head extending above said open end, whereby the slide may be moved to engage the head of the fish between the serrated members which securely hold the head for removal of the hook, the individual serrated blades on the slidable cover being independently movable to effectively engage the head of a fish, regardless of size, at least within reasonable limits.

It is another object of the invention to provide the opposite end of the box, upon which the same is supported on a supporting surface, with a foot-engageable member that is movable between a retracted inoperative position and an extended operative position in order that the user may place one foot upon the member and thereby securely hold the vertical box in operative position, especially while manipulating the slide at the upper end of the box for purposes of clamping the head of a fish which otherwise is extended into the box and after removing the hook from the head of the fish, the slide may be slightly retracted and the fish will drop into the box, which serves as a receptacle therefor.

Still further objects of the invention are to provide greater convenience in using the same, as well as providing multiple additional uses, including forming the slidable cover from suitable material, such as wood, whereby the same may serve as a board for cutting bait, a handle may be mounted upon one side of the box intermediately of the ends thereof so as to provide convenience in carrying the same, and the transverse dimensions of the box and length thereof preferably are such that when the box is lying horizontally upon the ground, one or possibly two people may sit thereon, such as while waiting for the fish to bite.

Details of the foregoing objects and of the invention, as well as other objects thereof, are set forth in the following specification and illustrated in the accompanying drawings comprising a part thereof.

DESCRIPTION OF THE DRAWINGS

FIG. 1 is a perspective view illustrating the apparatus of the invention in vertical, operative position and showing respectively in full lines and phantom, the inoperative and operative positions of a foot-engageable member on the lower end of the box receptacle of the apparatus.

FIG. 2 is an enlarged, partially fragmentary plan view of the upper end of the apparatus shown in FIG. 1, and comprising the slidable cover upon which gripping means are mounted for coaction with fixed gripping means along one edge of the upper end of the box receptacle shown in FIG. 1.

FIG. 3 is a side elevation, partially fragmentary, showing the cover illustrated in FIG. 2, as seen on the line 3—3 thereof.

FIG. 4 is a side elevation of the movable gripping means per se shown in FIGS. 2 and 3.

FIG. 5 is a fragmentary perspective view illustrating a further embodiment of foot-engageable means from the one illustrated in FIG. 1.

FIG. 6 is a fragmentary, vertical side elevation of fish-engageable clamp means attachable to one side of the box, as shown in FIG. 1.

FIG. 7 is a fragmentary front elevation of the clamp means shown in FIG. 6, as seen on the line 7—7 thereof.

DETAILED DESCRIPTION

Referring to the drawings, especially FIG. 1, the fish-holding apparatus of the invention comprises an enclosure in the form of a box 10 which may be made of any suitable material, such as wood, but preferably, the same is water-tight, especially when the same is disposed vertically and rests upon one end with the upper end being open. Accordingly, the bottom is water-tight with respect to the sides and the simple and inexpensive way of accomplishing this would also be to form the box of molded synthetic resin or plastics so as to be capable of containing ice, including the water from melted ice, for purposes of keeping fresh the fish to be contained therein. By way of a practical size, the box should preferably be at least two feet or more in height, as viewed in FIG. 1, and of the order of possibly ten or 12 inches square.

Associated with the lower end of the box is a foot-engageable member 12 which, in the embodiment of the invention shown in FIG. 1, is illustrated as being connected by a hinge 14 to the panel 16 of the box upon which, for example, a carrying handle 18 also may be attached. If desired, the foot-engageable member 12 may be recessed into the panel 16, or simply be disposed exteriorly upon the lower portion of the panel when in inoperative, retracted position, as shown in full lines in FIG. 1. In use, the member 12 is extended horizontally so as to rest upon the supporting surface upon which the bottom of the box 10, as shown in FIG. 1, reposes. By placing a foot upon the member 12, the box will remain steady upon the supporting surface while manipulating the cover or closure 20 which is slidable with respect to the open upper end of the box 10, as viewed in FIG. 1. The cover 20 preferably is slidable within suitable guide grooves 22 in the inner surfaces of the upper edges of the opposed panels at either side of panel 16. Parallel guide rails 24 are received in the grooves 22 and, preferably, the cover 20 is made from appropriate material which will enable the same to be used as a cutting board, such as for cutting bait. One highly suitable material is appropriate wood, but other preferably non-metallic materials may be used, which will not seriously dull a knife, such as chipped board, pressed board, or otherwise.

One of the important features of the present invention is that the cover 20 includes holding means for directly engaging a fish between the head and body thereof, especially to support and grip that portion of the fish, with the head projecting from the upper end of the box 10 so as to facilitate the removal of a hook on an exemplary line 26, which is engaged in the mouth of the fish 28, which is specifically illustrated as an eel. In fact, the gripping means provided by the present invention are especially adapted to facilitate the removal of hooks from difficult fish, such as eels, catfish and otherwise, which, either because of the slippery nature or the spurs on the opposite sides of the head of a catfish, for example, offer limited danger of injury to a fisherman incident to removing the hook from the mouth thereof. The gripping means referred to above are best illustrated in FIGS. 1–4, particularly for purposes of adapting the apparatus to be used with fish of different sizes, it is preferred that the gripping means comprise a first holding member 30, which, as shown in FIG. 3, is preferably U-shaped in cross-section, the outer edges of the sides thereof being serrated, as shown in FIG. 2. Said member may preferably be formed from steel or other suitable metal but appropriate rigid plastics conceivably can be used. The member 30 preferably is mounted stationarily along the inner surface of the upper edge of panel 32 of the box 10, which is opposite the panel 16. Cooperating with the fixed serrated holding means 30 there is preferably a plurality of movable serrated holding plates or members 32, the same preferably being in pairs vertically above and below each other as shown in FIG. 3. The plates or members 32 may be formed from similar material referred to above with respect to holding member 30, and at least the upper members 32 have longitudinal slots 34 therein for purposes of moving relative to guide screws 36. The ends of the members 32 opposite the guided ends thereof are serrated for coaction with the serrated edges of the first holding member 30.

Referring to FIGS. 3 and 4, it will be seen that the movable holding members 32 are rigidly secured to the upper and lower surfaces of a series of similar connecting members 38, which are independent from each other. The outermost ones have short guide rails 24' which are in longitudinal alignment with the guide rails 24 on opposite sides of the cover 20, and all of the same are slidably received within the guide grooves 22 in the upper end of box 10. Mounted at one end within the transverse connecting members 38 for each of the upper and lower pairs of movable holding members 32, which actually comprise sections of a composite movable holding unit, is a guide rod 40, the opposite end of which is slidable in a complementary guide bore 42 extending into the cover member 20 from the outer end thereof to which the movable holding members 32 are slidably connected. Surrounding each of the guide rods 40 is a compression spring 44, one end of which abuts the transverse connecting member 38 and the opposite end of which abuts the inner end of a counterbored seat 46, clearly shown in FIG. 3. Said springs function to strongly bias the movable holding members 32 outwardly from the end of the cover 20 with which they are associated.

In operation, when a fish, such as an eel or otherwise, is caught and it is desired to remove the hook from its mouth, the cover 20 is manually retracted to an open position to separate the outer ends of the movable holding members 32 from the stationary holding member 30 and provide sufficient space in order that the tail and body of the fish may be lowered into the box 10 when in such vertical position, shown in FIG. 1, until only the head extends above the upper end of the box. Since the box is maintained firmly upon a supporting surface by the foot of the operator engaging the foot member 12, the operator then moves the cover 20 inward to yieldably engage one or more of the sectioned movable holding members 32 with one side of the protruding part of the fish and firmly urge the same against the fixed holding member 30, which also is serrated. Due to the fact that the movable holding units comprising the upper and lower serrated members 32 and transverse connecting member 38 to which they are fixedly connected are capable of independent movement, it will be seen that, for example, if only the middle holding members 32 on connecting member 38 engages the head of a fish, the other movable holding members 32 are capable of being moved into contact with the serrated edges of the first holding member 30 and thereby, adequately close the interior of the box 10 so as to prevent an actively swishing eel, for example, from attempting to wiggle out of the box by thrashing its tail up through any space between the stationary and movable serrated holding members under circumstances where such space existed. However, by providing a series of sections of the movable holding members, no such space is made possible and the fish will be securely held between the movable and stationary serrated members in a yieldable manner. Then, after the hook is removed, limited retraction of the cover 20 sufficient to disengage the head of the fish between the serrated gripping members will result in the fish dropping into the box 10 where it is securely stored and retained in fresh condition, especially if ice is also contained in the box 10.

The cover 20 is of sufficient thickness that it readily can accommodate the complementary guide bores 42. Also, to hold the cover 20 in fish-engaging position and thus, free both hands of an operator to remove the hook from the head of the fish, said cover is releasably retained in such gripping position by appropriate means such as latching means, shown best in FIGS. 2 and 3, wherein is shown a spring-pressed plunger 48, which engages one of a series of dimples 50 formed, for example, in a plate 52 which is recessed into the lower surface of the cover 20 and secured therein by appropriate means, such as small screws or otherwise.

A second embodiment of foot-engageable member is illustrated in FIG. 5 wherein there is shown a slidable engageable member 54 which may be moved between retracted stored position and extended operative position. To effect moving the same, a finger-engageable depression 56 may be formed in the outer end thereof which preferably is never extended into the groove or slot in the bottom of the box 10 which receives the slidable member 54. Likewise, the slidable cover 20 preferably is provided with a finger-engageable slot 58.

Another convenience afforded by the present invention comprises a shoulder strap 60 which is of appropriate length and the opposite ends are secured to opposite sides of the box 10 as illustrated in FIG. 1, whereby, if it is desired to carry the box upright, especially if it contains ice and/or water and possibly also fish which have been caught, the strap may be slung over the shoulder of the person using the same and conveniently carry the box more or less in vertical position with comfort, rather than use the side handle 18. Further, the length of the box 10 preferably is such that it may be laid upon one side on a supporting surface, such as the bank of a stream and used as a seat and the strength of the box is adequate to enable the same to be used for such purpose.

In addition to the foregoing conveniences, the box also preferably includes a fish clamp 62, shown in FIGS. 1, 6 and 7, which preferably is spring-pressed and the lower edge of the blade is serrated at 64, the strength of the spring preferably being such as to securely hold, for example, the tail of a fish or any other desired portion of the body of the fish to facilitate the gutting and cleaning of the fish, as well as de-scaling the same, an exemplary portion of a fish 66 being shown in FIGS. 6 and 7.

From the foregoing, it will be seen that the present invention provides a fish-holding box and associated apparatus which renders the same capable especially of conveniently and securely holding a fish adjacent the head thereof while removing a hook therefrom, as well as providing means for the slidable cover serving as a cutting board and to insure the upright position of the box 10 when in preferred use; foot-engageable members of several types are provided to hold the box steady in vertical position while manipulating the cover 20, for example, incident to clamping or unclamping a fish head with respect to the upper end of the box 10. The box is capable of being manufactured and sold at reasonable prices and, if desired, also may include a fish-clamping member to assist in preparing the fish to render it edible by holding at least one end of the fish while a person operates upon the exposed portion of the fish.

The foregoing description illustrates preferred embodiments of the invention. However, concepts employed may, based upon such description, be employed in other embodiments without departing from the scope of the invention. Accordingly, the following claims are intended to protect the invention broadly, as well as in the specific forms shown herein.

I claim:

1. Fish-holding apparatus comprising an elongated box having opposite ends, one of said ends being closed and adapted to engage a supporting surface to support the box in upright operative position, the opposite end of said box when in said operative position having a closure extending transversely thereacross and provided with opposite guided edges, opposed parallel guide means on said opposite end of the box slidably engaging said guided edges on opposite sides of said closure for movement thereof between open and closed positions, a stationary holding member having a serrated edge mounted along one edge of said opposite end of said box in opposition to the innermost end of said closure, a second holding member mounted upon said innermost end of said closure which extends between said guided edges and having a serrated edge cooperable with said stationary holding member to grip the head of a fish therebetween to hold the fish while removing a hook from the head of said fish, means yieldably supporting said second holding member upon said closure for yielding movement relative thereto and adapted to urge the same toward said innermost end of said closure and thereby yieldably grip the head of a fish engaged by said stationary holding member, and handle means on said closure adjacent the end opposite said innermost end operable to retract the holding means on said closure from engagement with a fish head and permit the fish to drop into the box after removing a hook from the fish head.

2. The apparatus according to claim 1 in which said second holding member is sectional and comprises a plurality of similar individual holding members, each individually yieldably supported by said closure and operable for independent movement in use from said stationary holding member to accommodate the sectional holding members to engage various sizes and widths of fish.

3. The apparatus according to claim 1 further including a foot-engageable member hingedly connected at one end to one end of the closed end of said box and extending therefrom transversely in operative position for engagement by a foot to hold the box vertically stationary upon a supporting surface while manipulating the closure and said member being foldable upwardly along one side of said box in inoperative position.

* * * * *